Patented Aug. 9, 1932

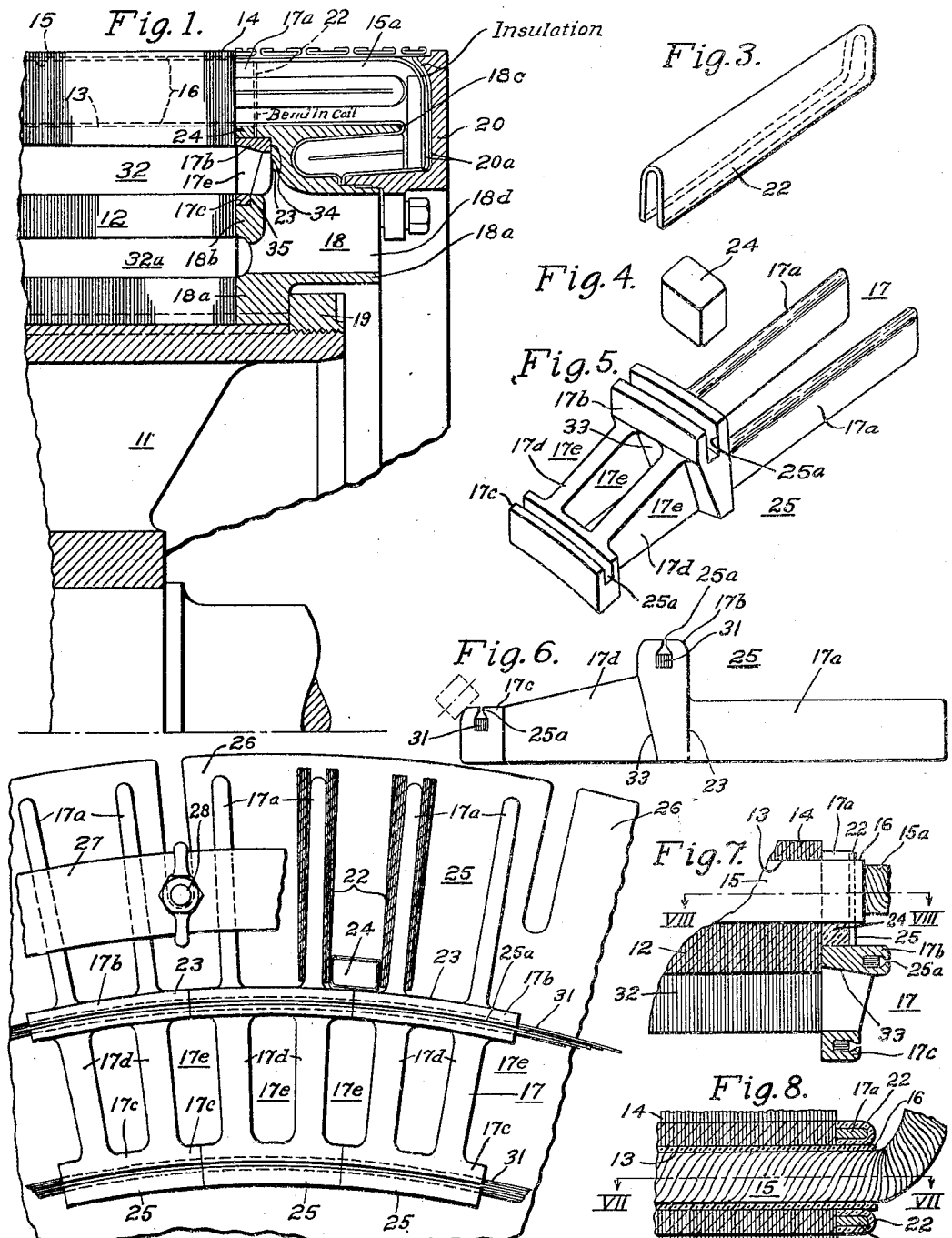

1,870,813

UNITED STATES PATENT OFFICE

HERBERT G. JUNGK, OF WILKINSBURG, PENNSYLVANIA, ASSIGNOR TO WESTINGHOUSE ELECTRIC & MANUFACTURING COMPANY, A CORPORATION OF PENNSYLVANIA

FINGER PLATE

Application filed March 26, 1929. Serial No. 349,986.

My invention relates to electrical apparatus, and more particularly to clamping means or finger plates for holding core laminations in face-to-face relation.

In dynamo-electric machines, it has been the practice to allow the slot-insulating cells which are utilized for enclosing the windings embedded within the slots in the periphery of the laminated core, to project a considerable distance outwardly from the end of the core and finger plate for the purpose of insulating the winding from the clamping finger plate. In such machines, the ends of the windings, external to the core, are often bent over the ends of the projecting slot cell. In some machines, particularly in railway motors where designers are concerned with keeping down the overall lengths of the machines, the bending of the end windings at a point so far removed from the end of the core is a disadvantage in that it takes up additional space, and, at the same time, a considerable amount of copper is wasted; the said amount is not essential to the operation of the motor, and, as a matter of fact, has all of the disadvantages commonly attributed to end windings.

It is an object of my invention to provide means which will insulate the windings from the finger plate and which will allow the end windings to be bent at points nearer to the end of the core.

It is a further object of my invention to provide a finger plate that is novel by reason of the fact that it is constructed of segments and to provide a method of assembly by which a more perfect alignment of the finger projections is obtained.

In general, my invention comprises a segmental finger plate, the segments of which are held in circumferential relation by means of rings embedded in circular grooves cut into the side faces of the segments. Mica insulating pieces are provided to fit over the finger projections for insulating the same from the end windings.

For a better understanding of my invention, reference may be had to the following description in connection with the drawing, wherein Figure 1 is a central longitudinal sectional view of a portion of an armature of a dynamo-electric machine embodying my invention, Fig. 2 is an end elevational view of my segmental finger plate, and also illustrating the method of assembly.

Figs. 3 and 4 are perspective views of the insulating means utilized for insulating the end windings from the finger projections of my finger plate, Fig. 5 is a perspective view of one of my finger plate segments prior to assembly, Fig. 6 is a side view of a segment, illustrating a step in the manufacture thereof, Fig. 7 is a fragmentary sectional view, on the line 7—7 of Fig. 8, showing, in detail, the features of my invention, and Fig. 8 is another fragmentary sectional view, on the line 8—8 of Fig. 7, illustrating the bend in the winding and the arrangement thereof in one of the slots of the armature.

In Fig. 1 is illustrated a rotatable armature of a railway motor comprising a spider member 11 and a laminated core 12 having slots 13 near its outer periphery, thus having teeth 14 between the slots. Armature windings 15 are provided, including portions which are embedded in the slots of the core and are insulated therefrom by means of slot cells 16.

My invention comprises a novel finger plate 17, which is shown, detached from the armature, in Fig. 2. The finger plate 17, when completely assembled, comprises radially-extending fingers 17a supported by a ring 17b which is, in turn, connected to an inner ring 17c, by means of short radial webs 17d spaced apart from each other to provide ventilating spaces 17e therebetween, for a purpose to be subsequently described.

The finger-plate assembly 17 is centered and held in place against the core 12, by a retaining plate or end casting 18 carried by the armature spider 11. The end casting comprises three rings 18a, 18b and 18c held together by radial spider arms 18d between which ventilating air may flow, as subsequently described. Two rings, 18a and 18b, press directly against the punchings of the armature core 12 to retain the same in position, the ring 18a being itself retained by a ring nut 19 on the end of the armature spider 11. The ring 18b fits within the inner ring 17c of the finger-plate assembly, thereby centering the same. The third ring 18c of the end casting 18 presses the finger plate 17 against the core and also serves as a support for the end turns 15a of the armature winding. An additional ring member 20 is carried by said third ring 18c to completely enclose the end turn 15a from which it is insulated by sheet-material 20a.

Heretofore, it has been common practice, in armatures using the finger plates of the prior art, to allow the ends of the slot cell to project outwardly for some distance beyond the end of the core and finger plates, in order to insulate the finger plates from the end windings. It is the usual practice to bend the end turns at an angle with the axis of the armature, and, in the previous structures, to utilize an extension of the slot cell to insulate the end turns from their finger plates, the bend, which must be at the end of the projecting slot cell, therefore, comes far out from the armature core, making an unduly long end turn and an unduly long armature.

In my construction, I cover the finger portions 17a of the finger plate with a trough-shaped insulating piece 22 which is shown detached in Fig. 3. This construction allows my slot cell 16 to be terminated at the edge of the finger plate 17 and it allows the end turns to be bent at a point nearer to the end of the core, thus effecting a great saving in copper. In fact, the end turns may be bent over the insulating mica pieces 22. The surfaces 23, at the base of the finger projections 17a of the end plate or finger plate 17, are insulated from the windings by means of insulating blocks 24, as indicated in Figs. 1 and 2, the block being shown detached in Fig. 4.

The details of my novel finger plate 17 are illustrated in Figs. 2, 5 and 6, inclusive.

The finger plate 17 is made up in separate units or segments 25 for accuracy in assembly. Each segment 25 has two finger portions 17a, two webs 17d, one ventilating space 17e and two half ventilating spaces 17e, as shown in Fig. 5. Each segmental unit 25 also has two segmental ring-portions 17b and 17c, the ends of which form the abutting side surfaces of the units 25 when they are assembled in a circle.

No rivets are used in assembling the finger-plate units. Instead, I assemble all of the finger-units 25 in a circle on a plate or support 26, as illustrated in Fig. 2, and clamp them in place in the form of a complete circle by means of a clamping arrangement comprising a clamping ring 27 and a screw clamp 28. A groove 25a is then turned in the outer face of each of the rings 17b and 17c of the assembled finger plate, and these grooves are then wound with seven turns of phosphor-bronze strip 31, or with any other resilient material, until there is room for no more turns, after which the material of the finger plate is rolled over, to close the grooves, as indicated in Fig. 6. The inner walls of the grooves 25a on the respective segmental units 25 thus constitute shoulders, at equal distances from the center of the circle, around which the banding-strips 31 are wound.

The laminated core 12 may be provided, below the conductor-receiving slots 13, with two rows of ventilating openings, the outer openings 32 registering with the ventilating openings 17e of the finger plate, and the inner openings 32a being disposed below the inner ring 17c of the finger plate and below the ring 18b of the end casting 18. The spaces between the spider arms 18d of the end casting 18 register with these ventilating openings 32 and 32a and 17e. The openings 17e in the finger plate may have inclined top walls 33, as shown in Figs. 1, 5 and 6, for directing the ventilating air leaving the armature downwardly into ventilating ducts of the end casting 18, where the air is directed still further inwardly, toward the shaft, as it leaves the armature core ducts 32, thus providing clearance for the end turns 15a.

The finger plate is made of brass or similar alloy which is preferably non-magnetic. Large brass castings present a serious problem by reason of the shrinkage of the material on cooling. Even if the finger plate 17 were made of iron, it would be difficult to secure the necessary accuracy in a single, large casting. For this reason, I employ about sixty-three small segmental castings 25, out of which a composite finger plate 17 is made, and, even then, a considerable allowance for shrinkage must be made—something of the order of 0.8 of one per cent.

In Figs. 3 and 4, the shapes of the insulating pieces 22 and 24 are shown more in detail. Each insulating finger piece 22 is made by rolling a small strip of mica insulation into a U-shaped piece. The pieces may be tapered, in cross-section, as shown, in order to provide parallel sides to the fingers for engagement with parallel sides of the windings, for the purpose of insuring a tight fit between the fingers and the armature windings.

It will be noted that the larger ring 17b of the finger plate fits within a groove or seat 34 in the outer ring 18c of the retaining plate or casting 18, and that the smaller ring 17c of the finger plate fits within a groove or seat 35 in the intermediate ring 18b of the retaining plate 18, as shown in Fig. 1. An important feature of my invention is to so dimension the parts that when the end casting 18 is tightened up against the laminations 12, by means of the nut 19, the outer seat 34 tightens first against the outer ring of the finger plate, so that greater pressure is applied to the laminations at points near the bases of the teeth which it is the function of the finger plate to support.

I have illustrated only one arrangement of the insulating members; but, since I have insulated the finger portions 17a, it will be seen that the slot cells 16 may terminate, if desired, at the end of the core 13 and may abut against finger-insulating pieces 22, instead of passing between them, as shown in Figs. 1, 7 and 8.

I claim as my invention:

1. In a dynamo-electric machine, a laminated core having teeth on the periphery thereof and longitudinal ventilating openings, a finger plate having finger projections and ventilating openings which are so arranged as to register with the respective teeth and ventilating openings of said core, said finger plate consisting of a plurality of segmental units having parts abutting to form a circumferential ring, when assembled into a complete finger plate, and banding means for holding said segments in abutting circumferential relation, and means for holding said assembled finger plate against said core.

2. In a dynamo-electric machine, a laminated core having teeth thereon, a finger plate having two rings of predetermined axial lengths, retaining means for maintaining said finger plate against said core, said retaining means having surfaces in abutting engagement with the rings of said finger plate, respectively, the outer ring of said finger plate engaging with the corresponding abutting surface of said retaining means with greater pressure than the pressure between the inner ring of the finger plate and the abutting surface corresponding thereto.

3. A segmental finger plate for a dynamo-electric machine, each of the segments having finger portions, and banding means for tightly joining said segments together in non-overlapping, end-to-end circumferential relation to each other in a rigid, self-supporting, separate unit.

4. A segmental finger plate for a dynamo-electric machine, each of the segments having finger portions and having ventilating openings therein, and banding means for tightly joining said segments together in end-to-end circumferential relation to each other in a rigid unit removable as a whole piece from said machine.

5. A segmental finger plate for a dynamo-electric machine, each of the segments having finger portions, each of said segments being provided with a ventilating space and half ventilating spaces in each of the sides of said segments, in circumferential alignment with said first-mentioned opening, and banding means for tightly joining said segments together in end-to-end circumferential relation to each other in a rigid unit removable as a whole piece from said machine.

6. A segmental finger plate for a dynamo-electric machine, each of the segments comprising two axially-extending ring portions, and spaced radially extending portions constituting portions connecting the two ring portions, each of said segments having also at least one finger projection, and banding means for tightly joining said segments together in end-to-end circumferential relation in a rigid, self-supporting, separate unit.

7. A finger plate for a dynamo-electric machine comprising a plurality of separate segmental units fitting together to form a complete circle, each unit having at least one radially extending finger, the assembled units having a circular groove in one of the flat faces thereof, a flexible resilient strap disposed in said groove in a plurality of touching spiral convolutions filling said groove, and retaining means for preventing the lateral displacement of said convolutions out of the groove.

8. A finger plate for a dynamo-electric machine comprising a plurality of separate segmental units, each unit comprising a casting, each unit having at least one radially extending finger and abutting sides adapting a complete set of units to fit together to form a circle, and a shoulder so disposed that the shoulders of the assembled units are at substantially equal distances from the center of the circle, and a retaining ring disposed around the shoulders of the assembled units.

9. A finger plate for a dynamo-electric machine comprising a plurality of separate segmental units, each unit comprising a casting made of a non-magnetic metallic material, each unit having at least one radially extending finger and abutting sides adapting a complete set of units to fit together to form a circle, and a shoulder so disposed that the shoulders of the assembled units are at substantially equal distances from the center of the circle, and a retaining ring disposed around the shoulders of the assembled units.

10. A finger plate for a dynamo-electric machine comprising a plurality of separate segmental units fitting together to form a complete circle, each unit comprising a casting made of a non-magnetic metallic material having a shrinkage of the order of 0.8 of one per cent on cooling, each unit having at least one radially extending finger, the assembled units having a circular groove in one of the flat-faces thereof, a flexible resilient metal strap disposed in said groove in a plurality of touching spiral convolutions filling said groove, and retaining means for preventing the lateral displacement of said convolutions out of the groove.

11. A finger plate for a dynamo-electric machine comprising a plurality of separate segmental units, each unit having at least one radially extending finger and abutting sides adapting a complete set of units to fit together to form two complete rings, the assembled units having a circular groove in each ring on one side of the finger plate, a flexible, resilient, metal strap disposed in each of said grooves in a plurality of touching spiral convolutions filling the respective grooves, and retaining means for holding said metal straps in said grooves.

12. A finger plate for a dynamo-electric machine comprising a plurality of separate segmental units, each unit having at least one radially extending finger and abutting sides adapting a complete set of units to fit together to form a circle, the assembled units having substantially tangentially directed mating openings in the abutting sides thereof, and means constituting a multi-leaf metallic spring filling said openings and holding said units in proper assembled relation to one another.

13. A composite circular member comprising a plurality of separate segmental units fitting together to form a complete circle, characterized by means for holding the assembled segmental units substantially immovably with respect to each other, in a rigid unitary structure, the assembled units having a circular groove in one of the flat-faces thereof, a flexible resilient strap disposed in said groove in a plurality of touching spiral convolutions filling said groove, and retaining means for preventing the lateral displacement of said convolutions out of the groove.

14. A composite circular member comprising a plurality of separate segmental units, each unit having abutting sides adapting a complete set of units to fit together to form two complete rings, characterized by means for holding the assembled segmental units substantially immovably with respect to each other, in a rigid unitary structure, the assembled units having a circular groove in each ring on one side of the finger plate, a flexible, resilient, metal strap disposed in each of said grooves in a plurality of touching spiral convolutions filling the respective grooves, and retaining means for holding said metal straps in said grooves.

15. A composite circular member comprising a plurality of separate segmental units, each unit having abutting sides adapting a complete set of units to fit together to form a circle, characterized by means for holding the assembled segmental units substantially immovably with respect to each other, in a rigid unitary structure, the assembled units having substantially tangentially directed mating openings in the side thereof, and means constituting a multi-leaf metallic spring filling said openings and holding said units in proper assembled relation to one another.

In testimony whereof, I have hereunto subscribed by name this 16th day of March, 1929.

HERBERT G. JUNGK.